United States Patent [19]
Schmitt

[11] Patent Number: 5,775,794
[45] Date of Patent: *Jul. 7, 1998

[54] HEADLAMP ADJUSTOR WITH VENT TUBE

[75] Inventor: Karl R. Schmitt, Rockford, Ill.

[73] Assignee: Textron Inc., Providence, R.I.

[ * ] Notice: The term of this patent shall not extend beyond the expiration date of Pat. No. 5,692,935.

[21] Appl. No.: 659,701

[22] Filed: Jun. 19, 1996

Related U.S. Application Data

[63] Continuation-in-part of Ser. No. 509,130, Jul. 31, 1995, Pat. No. 5,642,935.

[51] Int. Cl.$^6$ .................................................. B60Q 1/06
[52] U.S. Cl. ................................... 362/66; 362/294
[58] Field of Search ........................... 362/61, 66, 294, 362/345, 373

[56] References Cited

U.S. PATENT DOCUMENTS

| | | | |
|---|---|---|---|
| 4,796,163 | 1/1989 | Dressler | 362/294 X |
| 4,802,068 | 1/1989 | Mokry | 362/294 X |
| 5,355,287 | 10/1994 | Denley | 362/66 |
| 5,488,547 | 1/1996 | Hiraoka | 362/66 |
| 5,642,935 | 7/1997 | Schmitt | 362/294 |

*Primary Examiner*—Stephen F. Husar
*Attorney, Agent, or Firm*—Trexler, Bushnell, Giangiorgi & Blackstone, Ltd.

[57] ABSTRACT

A venting structure is provided on a headlamp adjustor for venting the inside of a sealed stationary component which houses a movable headlamp component in a headlamp arrangement. The headlamp adjustor is mounted to the sealed stationary component and is used to effect pivotal motion of the headlamp component. The headlamp adjustor includes a housing member and an adjusting screw member which is operatively engaged with an axial bore through the housing member. A vent passageway is formed through the housing member or through the screw member. The venting structure is formed of a vent which is connected to headlamp adjustor and is in communication with the vent passageway through the housing member. The vent allows pressure and moisture laden air to pass outwardly from the inside of the sealed stationary component to the atmosphere while only allowing air and a limited amount of moisture to pass from the atmosphere to the inside of the sealed stationary component. The vent may take the form of a microporous filter material housed in tube-like body member; a rubber flapper valve; absorbent material, such as a porous cloth, swab or granulated material enclosed in a housing; a burper housed in a protective housing; a check valve; a bladder or balloon housed in a protective housing; or a condenser.

26 Claims, 5 Drawing Sheets

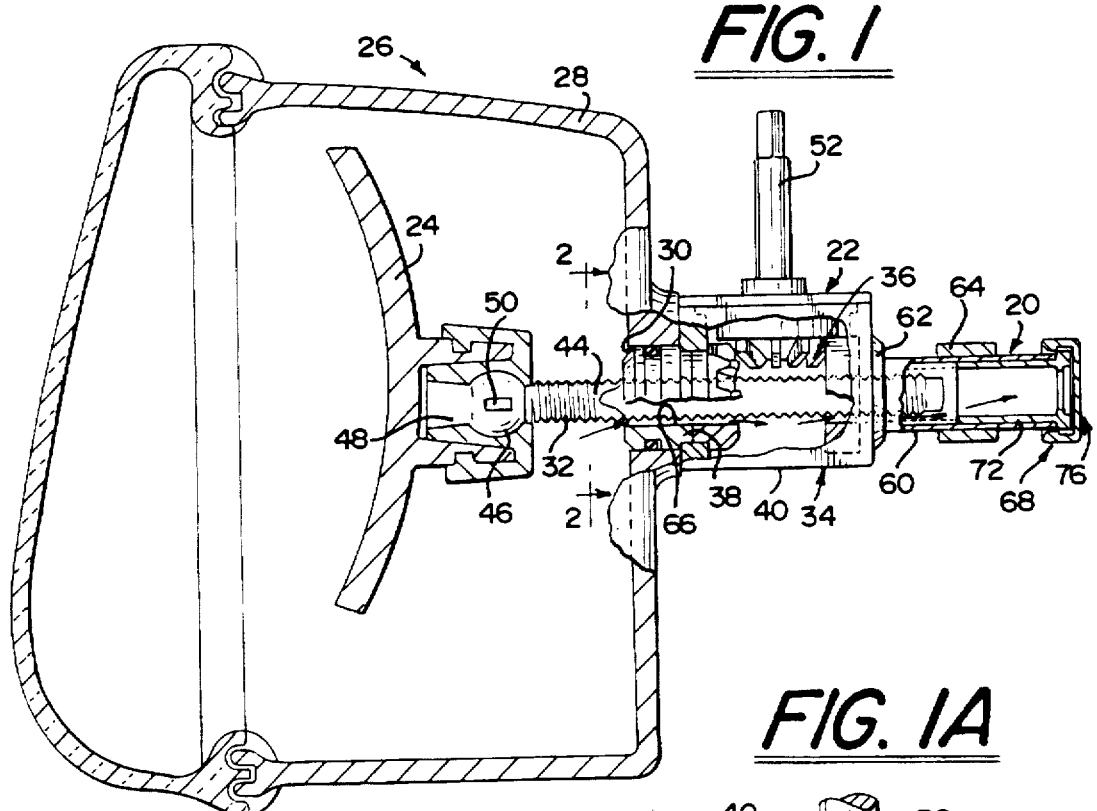
FIG. 1
FIG. 1A
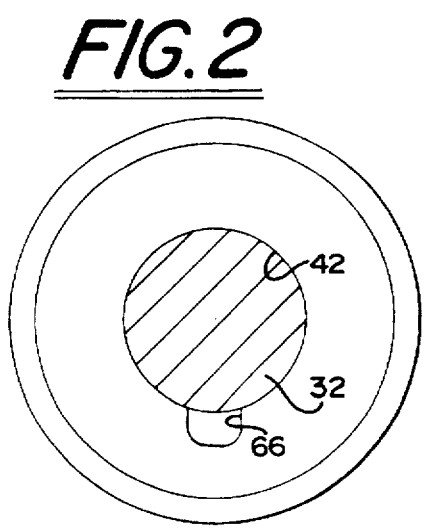
FIG. 2
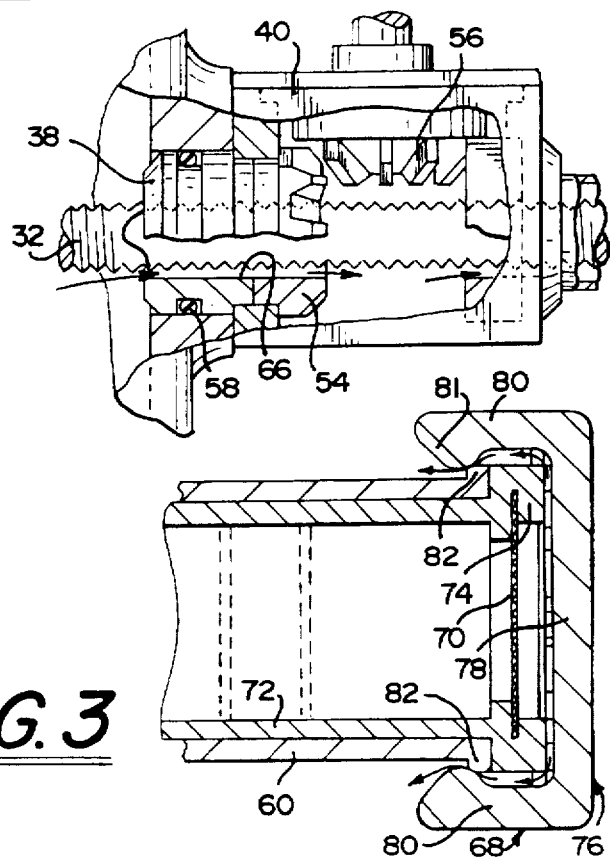
FIG. 3

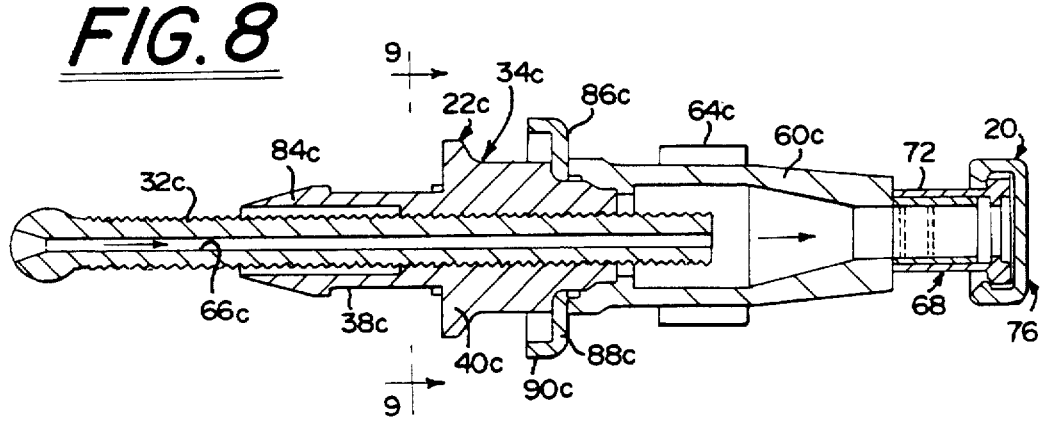
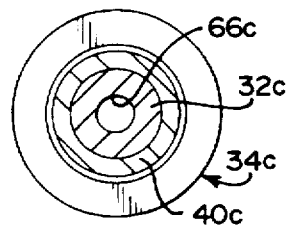
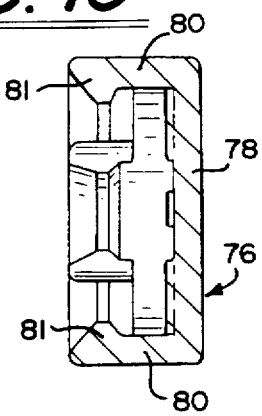
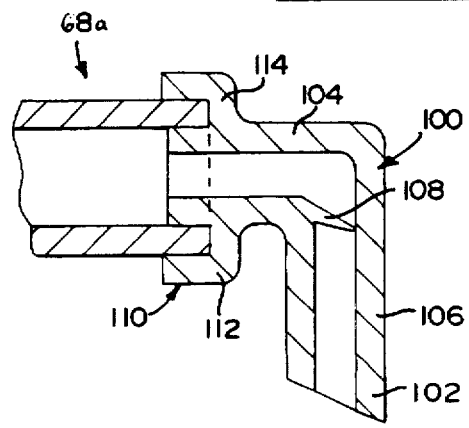

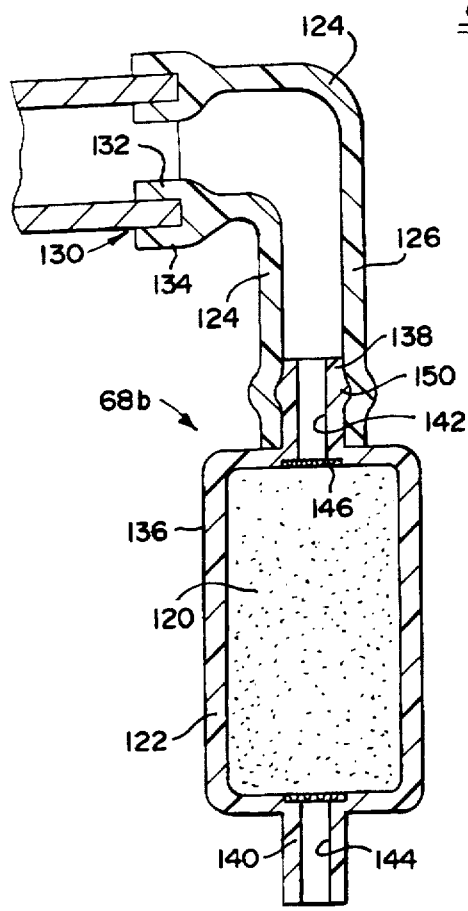
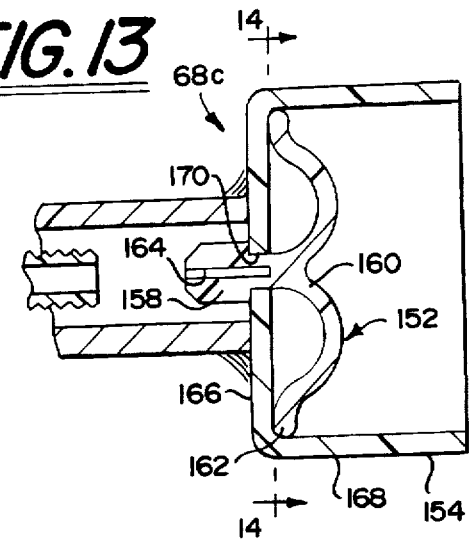
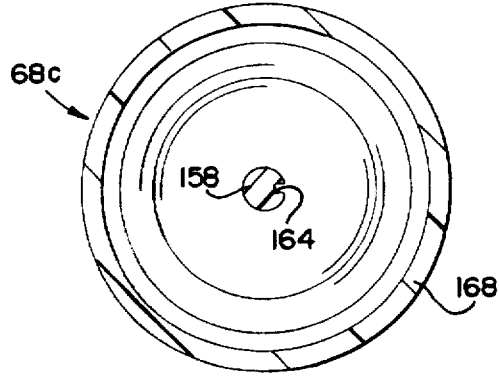
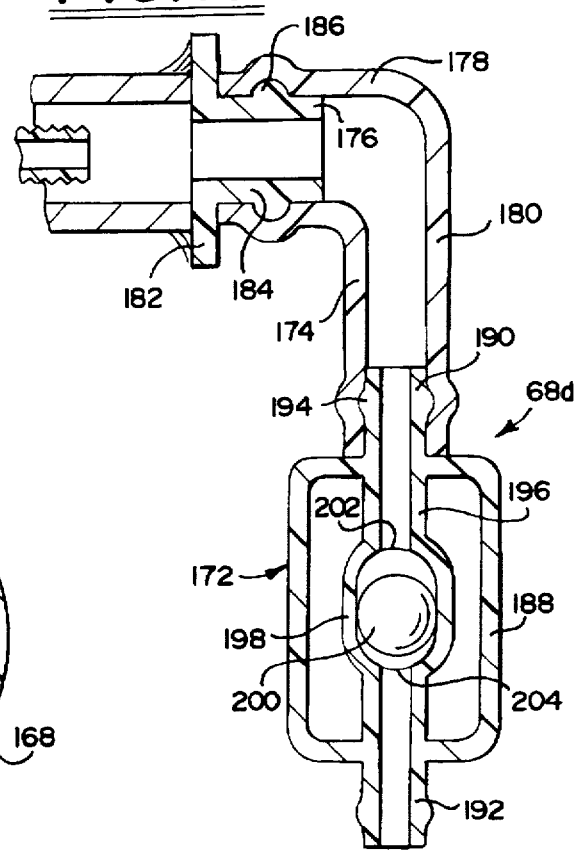

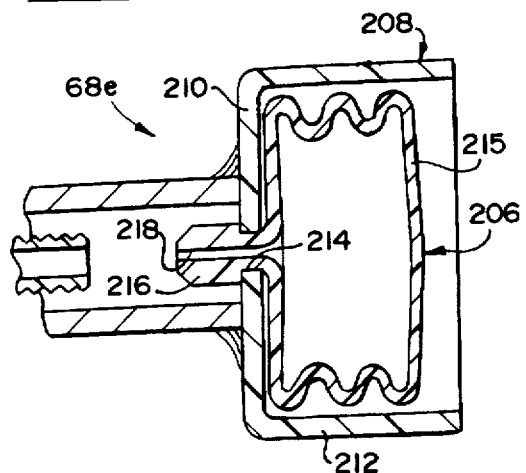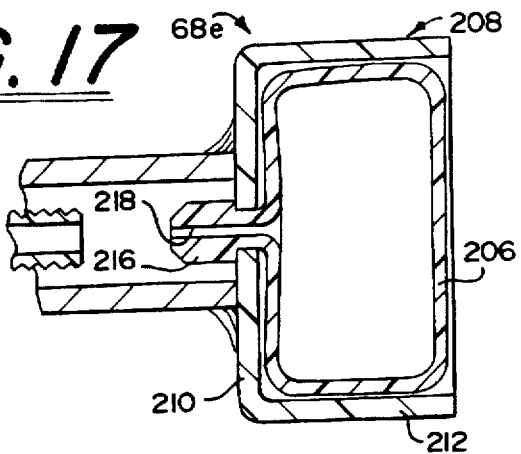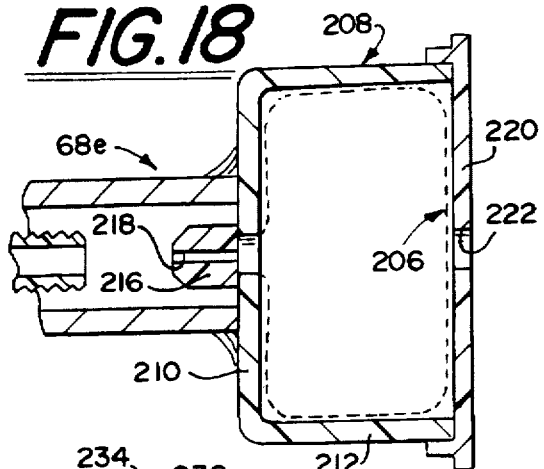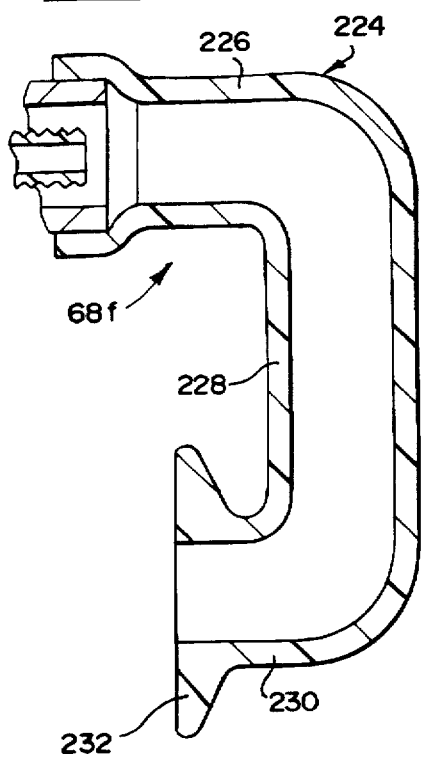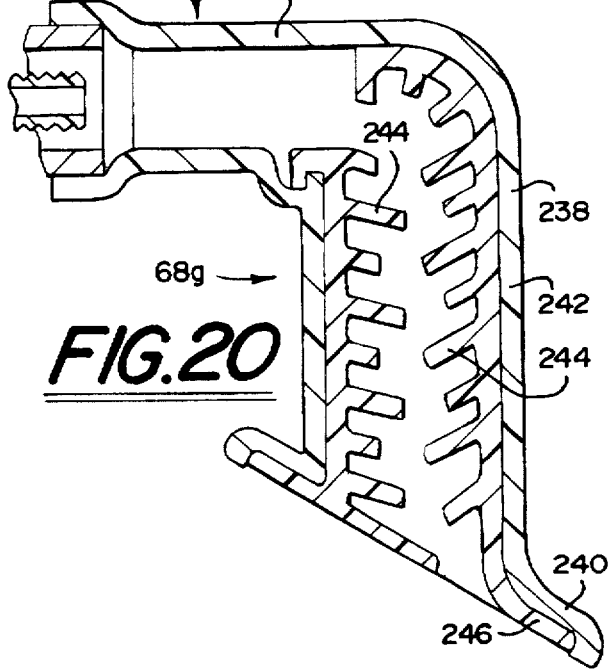

5,775,794

HEADLAMP ADJUSTOR WITH VENT TUBE

This patent application is a continuation-in-part application of Ser. No. 08/509,130, entitled "HEADLLAMP ADJUSTOR WITH VENT TUBE" filed on Jul. 31, 1995, now U.S. Pat. No. 5,642,935.

BACKGROUND OF THE INVENTION

This invention is generally directed to a novel venting structure formed in a headlamp adjustor mechanism for venting an automotive headlamp arrangement. More particularly, the invention contemplates a venting structure which is incorporated into the design of a headlamp adjustor mechanism to vent pressure and moisture laden air from the inside of the headlamp arrangement to the atmosphere while allowing the passage of air and a minimal amount of moisture, if any, back into the inside of the headlamp arrangement to equalize internal pressures with atmospheric pressure.

Headlamp arrangements commonly used on automobiles today consist of a moveable headlamp component, such as a reflector member or the like, which is housed in a stationary component connected to the frame of the automobile. The stationary component is sealed to prevent the entrance of dirt, contaminants and moisture into the headlamp arrangement. An adjustor mechanism is provided through an aperture in the stationary component and is used to effect pivotal movement of the reflector member.

The adjustor mechanism includes a housing member which is sealed to the stationary component, and an adjusting screw member which is housed in an axial bore through the housing member. An end of the adjusting screw engages the moveable headlamp component to effect pivotal motion of the component when the screw is moved. The adjustor mechanism is sealed so as to prevent the entrance of moisture inside of the stationary component so as to prevent interference with the workings of the movable headlamp component.

Despite the fact that the headlamp arrangement is sealed to prevent the entrance of moisture therein, water often accumulates inside of the headlamp arrangement. This occurs because of microcracks in the joints between the components which are caused by stress over time which allow moisture to seep into the headlamp arrangement. As a result, sealed or improperly ventilated headlamp arrangements often eventually fail to keep the moisture out of the arrangement which can cause interference with the functioning of the headlamp.

The microcracks occur due to pressure differences encountered in use together with thermal expansion and contraction of the housing material. As such, when the headlamp is turned on, the air inside the headlamp is heated by the energized bulb in the headlamp which causes the air trapped in the lamp housing to expand and the pressure inside the sealed headlamp arrangement to build up. This, of course, is in addition to the thermal expansion caused by such heat. The force due to the pressure build up persists until the bulb is turned off. As the headlamp is turned on and off over time, the joints between the components eventually crack due to the pressure extremes and the expansion and contraction of the components.

During the time period when the bulb in the headlamp is on, the air from inside the headlamp leaks through the microcracks which slowly reduces the pressure inside the headlamp arrangement to atmospheric conditions. When the bulb is turned off, an equal amount of air must be allowed to pass back into the headlamp arrangement so that the air pressure inside the headlamp arrangement can equalize with atmospheric. Since the cracks are too small to allow for the free flow of air therethrough, a negative pressure condition persists as air slowly enters into the headlamp through the cracks. Under these conditions, if the headlamp arrangement is subjected to wet weather conditions, moist air and/or water droplets are drawn into the headlamp arrangement.

The headlamp arrangement does not usually eliminate the moisture inside of the arrangement when the headlamp is turned on again. Over time, an appreciable amount of water builds up within the headlamp arrangement.

To eliminate, or to at least substantially minimize, the entrance of moisture into the headlamp arrangement during energization of the bulb, moveable reflector headlamps are vented to decrease the pressure build up inside the headlamp and to allow the moisture which has entered into the headlamp arrangement to exit the arrangement. Specifically, the vents allow moisture and air pressure out of the headlamp and only air and a limited amount of moisture into the headlamp. These vents are typically formed as a small hole, a rubber diaphragm or a microporous meshed filter.

One such microporous filter, which uses a non-woven hydrophobic membrane made of Gore-tex®, is manufactured by Filtertek, Inc. Gore-tex® is a registered trademark of W.L. Gore & Associates, Inc. The filter is housed in a tube-like body member which is attached to an orifice in the stationary headlamp component. A cap snaps over the end of the tube-like body, but does not seal the end of the tube-like body, to protect the microporous filter from dirt, dust or other particles.

OBJECTS AND SUMMARY OF THE INVENTION

A general object of the present invention is to provide a venting structure which is formed as part of a headlamp adjustor mechanism which is used to vent pressure and moisture laden air from inside of a headlamp arrangement to atmosphere while allowing air and a limited amount of moisture back into the arrangement.

Another object of the present invention is to provide a headlamp adjustor mechanism having a venting structure that eliminates the need for a separate venting structure to be attached to a stationary component of a headlamp arrangement.

A further object of the present invention is to provide a venting structure which is formed as part of a headlamp adjustor mechanism which is used to vent pressure and moisture laden air from inside of a headlamp arrangement to atmosphere while allowing air and a limited amount of moisture back into the arrangement so as to allow the interior of the headlamp arrangement to equalize with the atmosphere.

The present invention discloses a venting structure which is formed as part of a headlamp adjustor mechanism for venting pressure and moisture laden air from the inside of a sealed automotive headlamp arrangement to the atmosphere while allowing air and a limited amount of moisture back into the sealed headlamp arrangement. The headlamp arrangement includes a movable headlamp component, such as a reflector member, which is housed in a sealed stationary component.

The headlamp adjustor mechanism is mounted to the sealed stationary component and is used to effect pivotal motion of the headlamp component. The headlamp adjustor mechanism includes a housing member and an adjusting screw member which is operatively engaged with an axial bore through the housing member.

The venting structure is provided as part of the adjustor mechanism and includes a vent passageway which extends through the housing member or through the adjusting screw member, and a vent which is connected to the headlamp adjustor mechanism and is in communication with the vent passageway. The vent allows pressure and moisture laden air to pass outwardly from the inside of the sealed stationary component to the atmosphere while only allowing air and a limited amount of moisture to pass from the atmosphere to the inside of the sealed stationary component. The vent may take the form of a microporous filter material, such as Gore-tex®, housed in a tube-like body member; a rubber flapper vent; absorbent material, such as a porous cloth, swab or granulated material enclosed in a housing; a burper valve housed in a protective housing; a check valve; a bladder or balloon housed in a protective housing; or a condenser. The vent passageway may be in fluid communication with the axial bore or completely separated from the bore.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is a partially cross-sectional view of a first embodiment of a headlamp adjustor mechanism in accordance with the present invention, shown with its housing partially broken-away, such mechanism having a first embodiment of a vent attached thereto, such vent forming part of a venting structure, and being shown in its environment as attached to a headlamp arrangement;

FIG. 1A is an enlarged sectional view showing the broken-away housing of the headlamp adjustor mechanism shown in FIG. 1;

FIG. 2 is a cross-sectional view of the headlamp adjustor mechanism along line 2—2 in FIG. 1;

FIG. 3 is a cross-sectional view of a modification to the first embodiment of the vent shown in FIG. 1 which forms part of the venting structure;

FIG. 8 is a cross-sectional view of a headlamp adjustor mechanism similar to that of the second embodiment shown in FIG. 4 and in accordance with the present invention, such mechanism having a vent in accordance with the first embodiment of the vent attached thereto;

FIG. 9 is a cross-sectional view of the headlamp adjustor mechanism along line 9—9 in FIG. 8;

FIG. 10 is a cross-sectional view of a cap which forms part of the venting structure shown in FIGS. 1, 4, 6 and 8;

FIG. 11 is a cross-sectional view of a second embodiment of a vent which forms part of the venting structure;

FIG. 12 is a cross-sectional view of a third embodiment of a vent which forms part of the venting structure;

FIG. 13 is a cross-sectional view of a fourth embodiment of a vent which forms part of the venting structure;

FIG. 14 is a cross-sectional view of the vent shown in FIG. 13 along line 14—14;

FIG. 15 is a cross-sectional view of a fifth embodiment of a vent which forms part of the venting structure;

FIG. 16 is a cross-sectional view of a sixth embodiment of a vent which takes the form of a bladder, such bladder being shown in its deflated condition, which forms part of the venting structure;

FIG. 17 is a cross-sectional view of the sixth embodiment of the vent, wherein the bladder is shown in its inflated condition;

FIG. 18 is a cross-sectional view of a modification to the sixth embodiment of the vent, wherein the bladder is shown in phantom lines its inflated condition;

FIG. 19 is a cross-sectional view of an seventh embodiment of a vent which forms part of the venting structure; and FIG. 20 is a cross-sectional view of a eighth embodiment of a vent which forms part of the venting structure.

DETAILED DESCRIPTION OF THE PREFERRED EMBODIMENT

Figure 4:
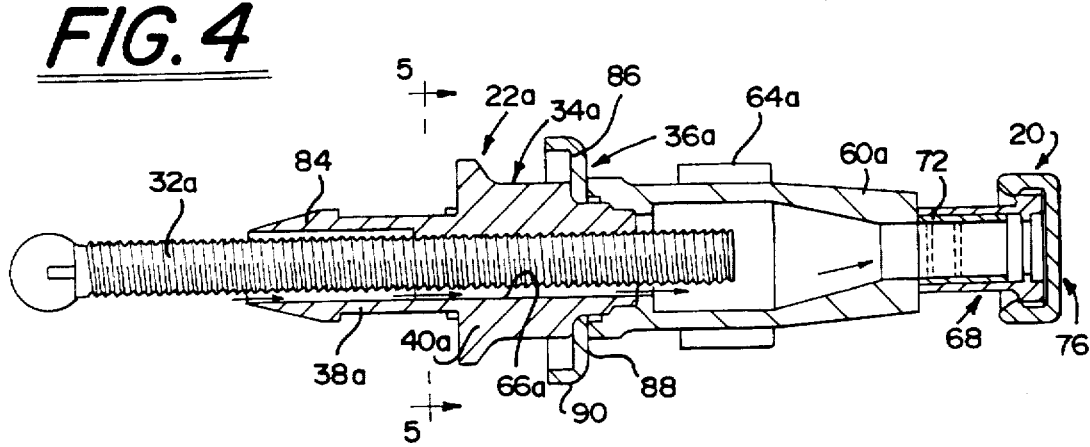
FIG. 4 is a cross-sectional view of a second embodiment of a headlamp adjustor mechanism in accordance with the present invention, such mechanism having a venting structure formed in accordance with the first embodiment of the vent therewith.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 5:
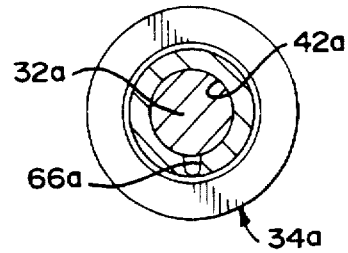
FIG. 5 is a cross-sectional view of the headlamp adjustor mechanism along line 5—5 in FIG. 4.
Figure 6:
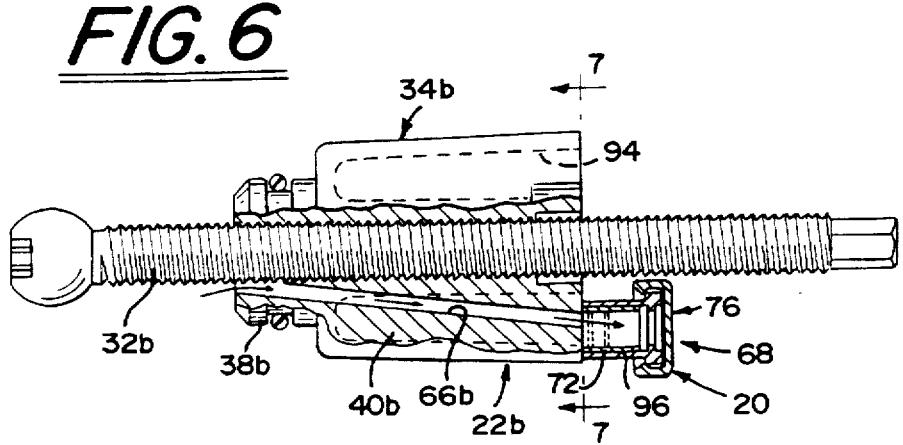
FIG. 6 is a partial cross-sectional view of a third embodiment of a headlamp adjustor mechanism in accordance with the present invention, such mechanism having a vent formed in accordance with the first embodiment of the vent attached thereto.
Figure 7:
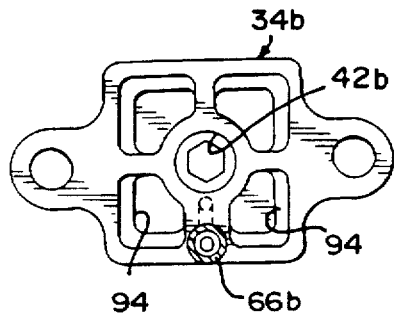
FIG. 7 is a partial cross-sectional view of the headlamp adjustor mechanism along line 7—7 in FIG. 6.

Directing attention to the drawings, a novel venting structure 20 is formed as part of a headlamp adjustor mechanism 22, 22a, 22b, 22c which is used to adjust the aiming of a movable headlamp component 24 in a headlamp arrangement 26. A first embodiment of the headlamp adjustor mechanism 22 is shown in FIGS. 1, 1A and 2. A second embodiment of the headlamp adjustor mechanism 22a is shown in FIGS. 4 and 5. A third embodiment of the headlamp adjustor mechanism 22b is shown in FIGS. 6 and 7. FIGS. 8 and 9 illustrate an embodiment of the headlamp adjustor mechanism 22c that is similar to that of the second embodiment, except for the differences noted herein. The elements of the first embodiment of the headlamp adjustor mechanism 22 are denoted solely by reference numerals. Like elements of the second embodiment of the headlamp adjustor mechanism 22a are denoted by like reference numerals with the suffix "a" thereafter and like elements of the third embodiment of the headlamp adjustor mechanism 22b are denoted by like reference numerals with the suffix "b" thereafter. In addition, like elements of the embodiment of the headlamp adjustor mechanism 22c shown in FIGS. 8 and 9 are denoted by like reference numerals with the suffix "c" thereafter.

While specific embodiments of the headlamp adjustor mechanism 22, 22a, 22b, 22c are shown in the drawings and described herein, it is to be understood that the type of adjustor mechanism that has the venting structure 20 of the present invention formed therewith is not limited to the specific embodiments shown and one skilled in the art may devise or select various modifications. For example, the venting structure 20 can also be formed in right angle and straight through adjustor mechanisms having zeroing devices.

The novel venting structure 20 of the present invention includes a through or vent passageway 66 which extends through the adjustor mechanism 22, 22a, 22b, 22c and a vent 68, which structure is described herein, is attached to the adjustor mechanism 22, 22a, 22b, 22c and is in fluid communication with the vent passageway 66 through the adjustor mechanism 22, 22a, 22b, 22c. A first embodiment of the vent 68 is shown in FIGS. 1, 4, 6 and 8. A modification to the first embodiment of the vent 68 is shown in FIG. 3. A second embodiment of the vent 68a is shown in FIG. 11. A third embodiment of the vent 68b is shown in FIG. 12. A fourth embodiment of the vent 68c is shown in FIGS. 13 and 14. A fifth embodiment of the vent 68d is shown in FIG. 15. A sixth embodiment of the vent 68e is shown in FIGS. 16-18. A seventh embodiment of the vent 68f is shown in FIG. 19 and an eighth embodiment of the vent 68g is shown in FIG. 20.

Directing attention to the first embodiment of the headlamp adjustor mechanism 22, as shown in FIGS. 1, 1A and 2, the mechanism 22 is shown in its environment as attached to the headlamp arrangement 26. The venting structure 20 is used to vent pressure and moisture laden air and also heat from inside the headlamp arrangement 26 to the atmosphere while only allowing air and a limited amount of moisture back into the inside of the headlamp arrangement 26.

The movable headlamp component 24, which is a reflector member or the like, is housed in a sealed stationary component 28, such as a headlamp housing, in the headlamp arrangement 26. The stationary component 28 has an orifice 30 therethrough along a rearside of the component 28 for the placement of the headlamp adjustor mechanism 22 therethrough.

As shown in FIG. 1, the first embodiment of the headlamp adjustor mechanism 22 generally includes an elongate, threaded adjusting screw 32, a housing 34 and a driving mechanism 36. The housing 34 may be and is preferably made of a plastic material by appropriate manufacturing methods such molding and the like. The housing 34 is generally comprised of a resilient, nose-like portion 38 and a base 40. The nose-like portion 38 of the housing 34 is attached to the stationary component 28, namely the reflector housing, through the orifice 30. The housing 34 has an axial bore 42 therethrough through which the threaded adjusting screw 32 is disposed.

The threaded adjusting screw 32 is formed from a high corrosion material or is coated with a high corrosion coating. The screw 32 is rotatable and axially displaceable relative to the housing 34. The adjusting screw 32 is comprised of an elongated threaded shaft 44 with a ball portion 46 at the end. The ball portion 46 is disposed in a complementarily shaped socket 48 formed on the pivotable component 24 and has fixed ears or nibs 50 in a spaced apart relationship which are fitted into complementary slots or spaces in the socket 48. The engagement of the nibs 50 in the slots causes the ball portion 46 to be held in the socket 48 and to be fixed against rotation.

The driving mechanism 36 is seated or disposed within the base 40 of the housing 34 and is operated by a drive component 52, which may take the form of a pre-assembled drive shaft, as shown, or a removable drive tool. The driving mechanism 36, when driven by the drive component 52, causes the rotation and axial displacement of the threaded adjusting screw 32 which displacement is used to adjust the position of the headlamp component 24 in a known manner.

The driving mechanism 36 includes a first mitered gear 54 and a second mitered gear 56, each of which are operatively associated with the base 40 of the housing 34. The first gear 54 encircles the adjusting screw 32. The drive component 52 is inserted into the housing 34, and engages the second gear 56. When the drive component 52 is rotated, rotation is imparted to the second gear 56 which imparts rotation to the first gear 54 which, in turn, causes the adjusting screw 32 to rotate and translate. When the adjustor mechanism 22 is actuated by the drive component 52, the adjustor mechanism 22 will pivot the headlamp component 24 about its axis until a desired aiming of the headlamp component 24 is achieved. The gear 54 has a non-circular bore in which the adjusting screw 32 is engaged with non-threaded flats on the adjusting screw 32, permitting the screw 32 to rotate with the gear 54, while also moving axially or translating. It is this axial or translatory movement of the adjusting screw 32 which is used to effect positioning of the headlamp component 26.

The housing 34 includes a plurality of O-rings to seal the housing 34 against the entry of dirt and moisture therein. O-ring 58 encircles the adjusting screw 32 and several O-rings (not shown) encircle the drive component 52.

An encapsulator member 60 is provided around the rear end of the adjusting screw 32 and is attached to the rear end of the housing 34. The encapsulator member 60 is a generally cylindrical, one piece, hollow member that surrounds the rear end of the adjusting screw 32. The encapsulator member 60 is substantially transparent and is made of a suitable material, such as plastic. The front end of the encapsulator member 60 terminates in a flange 62 which is ultrasonically welded, glued or otherwise affixed to the rear of the housing 34 to seal the rear portion of the housing 34 against the entry of dirt and moisture therein. The rear end of the encapsulator member 60 is open for reasons described herein.

A transparent follower member 64, which is made of a suitable material, such as plastic, is associated with the encapsulator member 60 and is used to designate an initial or "zero" position of the headlamp component 24. The follower member 64 is preferably, but not necessarily, a one piece member that encircles the encapsulator member 60. The follower member 64 is provided with an indicia, such as a number, to denote the "zero" position of the headlamp component 24. This indicia may be flanked by additional indicia, such as numbers, to denote variance from the zero position. The encapsulator member 60 and follower member 64 may be made in accordance with that disclosed in co-pending U.S. patent application Ser. No. 08/273,317, which is commonly owned by Applicant, and which disclosure is incorporated herein.

The novel venting structure 20 that is used with the adjustor mechanism 22 shown in FIG. 1 generally includes a through or vent passageway 66 which extends along the length of the adjustor housing 34. A first embodiment of the vent 68, which structure is described herein, is attached to the open rear end of the encapsulator 60 for venting pressure and moisture laden air from inside of the headlamp arrangement 26 to atmosphere while allowing air and a limited amount of moisture back into the headlamp arrangement 26.

The vent passageway 66 extends axially from the inside of the stationary component 28 to the rear end of the housing 28. The encapsulator member 60 encircles the rear end of the adjusting screw 32 and completely encircles the rear end of the vent passageway 66. In this embodiment, the vent passageway 66 is in fluid communication with the axial bore 42 in which the adjusting screw 32 is provided, i.e., there is no solid housing material separating the vent passageway 66 and the axial bore 42, such that air and moisture can flow along the length of the axial bore 42 and the vent passageway 66. It is to be understood that the vent passageway 66 may be completely separate from the axial bore 42 by solid housing material such that there is no possibility of fluid communication between the axial bore 42 and the vent passageway 66. In addition, the vent passageway 66 does not have to run axially through the housing 34 and instead, could be slanted or otherwise formed through the housing 34.

The first embodiment of the vent 68 includes a microporous filter material 70 which is housed in a tube-like body member 72. The filter material 70 is a nonwoven hydrophobic membrane, such as Gore-tex®, preferably of a two/ten/twenty micron filter, to allow air and moisture to pass out from the inside of the headlamp arrangement 26 to the atmosphere while allowing air and a limited amount of moisture to return into the headlamp arrangement 26 as described herein. Gore-tex® is a registered trademark of W.L. Gore & Associates, Inc.

The tube-like body member 72 has an enlarged shoulder 74 at its rearmost end. A cap 76, as best shown in FIG. 10, snaps over the rearmost end of the tube-like body member 72, but does not seal the end of the body member 72. The cap 76 protects the microporous filter material 70 from dirt, dust or other particles. The cap 76 has an annular end wall 78 with a plurality of legs 80 that depend from the end wall 78 and which are spaced apart from each other. The legs 76 have an enlarged bead 81 on the end of each of the legs 76. When the cap 76 is attached to the rearmost end of the tube-like body member 72, the beads 81 on the legs 80 snap over the shoulder 74 on the tube-like body member 72 to securely hold the cap 76 in assembled relation therewith, but does not seal the end of the body member 72. One such suitable vent 68 of this type is manufactured by Filtertek, Inc. This type of vent 68 is compact and inexpensive.

The vent 68 may be attached to the open rear end of the encapsulator member 60 by suitable means, such as by ultrasonically welding the tube-like body 72 around or within the end of the encapsulator member 60 or by adhesively joining the elements together. Alternatively, as shown in FIG. 3, the rear end of the encapsulator member 60 may include an enlarged shoulder 82 over which the bead 81 on the legs 80 snap to securely hold the vent 68 to the rear end of the encapsulator member 60. In this embodiment, the enlarged shoulder 74 on the tube-like body member 72 is securely captured between the end wall 78 of the cap 76 and the enlarged shoulder 74 of the encapsulator member 60.

When the pressure builds up within the headlamp arrangement 26, the pressurized air and any moisture which has accumulated therein will flow from inside of the stationary component 28 along the vent passageway 66 through the adjustor mechanism 22, through the hollow encapsulator member 60 and through the vent 68 as shown by the arrows in FIGS. 1 and 1A. The microporous filter material 70 in the vent 86 allows the moisture and air to pass from inside the encapsulator member 60 to the atmosphere, but only allows air and a minimal amount of moisture to pass back into the headlamp arrangement 26 from the atmosphere. Since air is allowed to return into the headlamp arrangement 26, the vent 68 allows the interior of the headlamp arrangement 26 to reach equilibrium with the atmosphere while keeping the entrance of water or moisture therein to a minimum.

Attention is now directed to FIGS. 4 and 5 which shows the second embodiment of the headlamp adjustor mechanism 22a in which the venting structure 20 may be formed. The headlamp adjustor mechanism 22a generally includes an elongated, threaded adjusting screw 32a, a housing 34a and a driving mechanism 36a. The adjusting screw 32a is identical in construction to the adjusting screw 32 used in the first embodiment of the adjustor mechanism 22. The housing 34a, which is preferably formed of plastic, is generally comprised of a resilient, nose-like portion 38a and a base 40a.

The nose-like portion 38a includes a plurality of resilient fingers or protrusions 84 which extend through the orifice 30 in the rearside of the stationary component 28. The resilient protrusions 84 can be snap-fit through the orifice 30. The housing 34a has an axial bore 42a therethrough through which the threaded adjusting screw 32a is disposed.

In this embodiment, the mitered gears 54, 56 of the driving mechanism 36 shown in FIGS. 1 and 1A of the first embodiment have been eliminated and instead, the driving mechanism 36a includes a stamped or die cast, metal gear 86 which is attached to a rear portion of the housing 34a. The gear 86 has circular body 88 with an aperture in the center. Surrounding the outermost extent of the body 88 are a series of teeth 90 which protrude from the gear 86 at a 90° angle from the body 88. As shown, the teeth 90 protrude in the forward direction, however, the teeth 90 may also protrude in the rearward direction. The gear 86 can be rotated by a suitable drive component (not shown) to impart movement to the adjusting screw member 32a to pivot the movable headlamp component.

An encapsulator member 60a is provided around the rear end of the adjusting screw 32a and is attached to the rear end of the housing 34a and to the rear surface of the gear 86 by suitable means, such as an ultrasonically weld or glue, to seal the rear portion of the housing 34a against the entry of dirt and moisture therein. The rear end of the encapsulator member 60a is open for attachment of a vent 68 thereto. A transparent follower member 64a may be provided on the encapsulator member 60a. The encapsulator member 60a and follower member 64a may be made in accordance with that disclosed in co-pending U.S. patent application Ser. No. 08/036,817, which is commonly owned by Applicant, and which disclosure is incorporated herein.

The venting structure 20 that is formed in the adjustor mechanism 22a generally includes a through or vent passageway 66a which extends along the length of the housing 34a. A vent 68, which structure is described hereinabove, is attached to the open rear end of the encapsulator 60a for venting pressure and moisture laden air from inside of the headlamp arrangement 26 to atmosphere while allowing air and a limited amount of moisture back into the headlamp arrangement 26.

The vent passageway 66a extends axially from the inside of the stationary component 28 to the rear end of the housing 28a. The encapsulator member 60a encircles the rear end of the adjusting screw 32a and completely encircles the rear end of the vent passageway 66a. In this embodiment, the vent passageway 66a is in fluid communication with the axial bore 42a in which the adjusting screw 32a is provided, i.e., there is no solid housing material separating the vent passageway 66a and the axial bore 42a, such that air and moisture can flow along the length of the axial bore 42a and the vent passageway 66a. It is to be understood that the vent passageway 66a may be completely separate from the axial bore 42a by solid housing material such that there is no possibility of fluid communication between the axial bore 42a and the vent passageway 66a. In addition, the vent passageway 66a does not have to run axially through the housing 34a and instead, could be slanted or otherwise formed through the housing 34a.

Since the structure of the vent 68 has been described hereinabove, the specifics of the structure is not repeated herein. The vent 68 may be attached to the end of the encapsulator member 60a by suitable means, such as by ultrasonically welding the tube-like body 72 around or within the end of the encapsulator member 60a or by adhesively joining the elements together. Alternatively, as shown in FIG. 3 and as described in detail hereinabove, the rear end of the encapsulator member 60a may include an enlarged shoulder over which the legs 80 on the cap 76 snap to securely hold the vent 68 to the rear end of the encapsulator member 60a.

When the pressure builds up within the headlamp arrangement 26, the pressurized air and any moisture which has accumulated therein will flow from inside of the stationary component 28 along the vent passageway 66a through the adjustor mechanism 22a, through the hollow encapsulator member 60a and through the vent 68 as shown by the arrows in FIG. 4. The microporous filter material 70 in the tube-like body member 72 allows the moisture and air to pass from inside the encapsulator member 60a to the atmosphere, but only allows air and a minimal amount of moisture to pass back into the stationary component 28 from the atmosphere. Since air is allowed to return into the stationary component 28, the vent 68 allows the interior of the headlamp arrangement 26 to reach equilibrium with the atmosphere while keeping the entrance of water or moisture therein to a minimum.

Attention is now directed to the third embodiment of the headlamp adjustor mechanism 22b which has the venting structure 20 formed therewith, as described herein, and is shown in FIGS. 6 and 7. The headlamp adjustor mechanism 22b generally includes an elongate, threaded adjusting screw 32b and a housing 34b. The adjusting screw 32b is identical in construction to the adjusting screw 32 used in the first embodiment of the adjustor mechanism 22.

The housing 34b, which is preferably formed of plastic, is generally comprised of a resilient, nose-like portion 38b and a base 40b. The nose-like portion 38b of the housing 34b is attached to the stationary component 28 through the orifice 30. The housing 34b has a plurality of pockets 94 formed therein and an axial bore 42b therethrough. The pockets 94 and axial bore 42b are separated from each other by solid material. The threaded adjusting screw 32b is disposed within and through the axial bore 42b.

In this embodiment of the adjustor mechanism 22b, the driving mechanism 36, 36a has been eliminated. Instead, the adjusting screw 32b is manually rotated by engaging the adjusting screw 32b with suitable means. In addition, the encapsulator member 60, 60a and the follower member 64, 64a have been eliminated. The rear end of the housing 34b may be sealed by suitable means, such as O-rings (not shown), to prevent the entrance of moisture through the axial bore 42b into the stationary component 28.

The venting structure 20 that forms part of the adjustor mechanism 22b generally includes a through or vent passageway 66b which extends along the length of the housing 34b. A tube 96, which is formed of suitable materials, such as rubber, is attached to the rear end of the housing 34b at the end of the vent passageway 66b by suitable means, such as adhesive. A vent 68, which structure is described hereinabove, is attached to the rear end of the tube 96 for venting pressure and moisture laden air from inside of the stationary component 28 to atmosphere while allowing air and a limited amount of moisture back into the stationary component 28.

The vent passageway 66b extends from the inside of the stationary component 28 to the rear end of the housing 28b. In this embodiment, the vent passageway 66b is formed separately from the axial bore 42b in which the adjusting screw 32b is provided such that solid housing material is between the vent passageway 66b and the axial bore 42b. It is to be understood that the vent passageway 66b may be formed as part of the axial bore 42b so that there is fluid communication between the axial bore 42b and the vent passageway 66b, if desired. In addition, while the vent passageway 66b is shown as being slanted from the front end of the housing 32b to the rear end of the housing 32b, the vent passageway 66b could instead run axially through the housing 34b or be otherwise formed through the housing 34b.

Since the structure of the vent 68 has been described hereinabove, the specifics of the structure is not repeated herein. The vent 68 may be attached to the rear end of the tube 96 by suitable means, such as by ultrasonically welding the tube-like body 72 around or within the end of the tube 96 or by adhesively joining the elements together.

When the pressure builds up within the headlamp arrangement 26, the pressurized air and any moisture which has accumulated therein will flow from inside of the arrangement 26 along the vent passageway 66b through the adjustor mechanism 22b, through the tube 96 and through the vent 68 as shown by the arrows in FIG. 6. The microporous filter material 70 in the tube-like body member 72 allows the moisture and air to pass from the inside of the stationary component 28 to the atmosphere, but only allows air and a minimal amount of moisture to pass back into the stationary component 28 from the atmosphere. Since air is allowed to return into the stationary component 28, the vent 68 allows the interior of the headlamp arrangement 26 to reach equilibrium with the atmosphere while keeping the entrance of water or moisture therein to a minimum.

Attention is now directed to FIGS. 8 and 9 which shows a preferred embodiment of the headlamp adjustor mechanism 22c in which the venting structure 20 is formed. This embodiment of the headlamp adjustor mechanism 22c is substantially similar to the headlamp adjustor mechanism 22 shown in the second embodiment. The headlamp adjustor mechanism 22c generally includes an elongated, threaded adjusting screw 32c, a housing 34c, an encapsulator member 60c and a driving mechanism 36c. The housing 34c, which is preferably formed of plastic, is generally comprised of a resilient, nose-like portion 38c and a base 40c and includes a gear 86c therearound. The nose-like portion 38c, the gear 86c and the encapsulator member 60c are identical in construction to that of the second embodiment and a description of those elements is not repeated herein.

The housing 34c has an axial bore 42c therethrough which is sized to receive the screw 32c and through which the threaded adjusting screw 32c is disposed. The vent passageway 66a through the base 40a of the housing 34a, as shown in the second embodiment of the head adjustor mechanism 22a, has been eliminated in this embodiment.

The venting structure 20 that is formed in the adjustor mechanism 22c is the preferred embodiment and generally includes a through or vent passageway 66c which is provided through the adjusting screw 32c and extends along the length of the adjusting screw 32c. The vent passageway 66c is formed through the screw 32c by suitable means, such as by cold head, injection molding, forging, casting or screw machining. The passageway 66c may be formed through the center of the screw 32c, as shown, or offset from the center of the screw 32c. A vent 68, which structure is described hereinabove, is attached to the open rear end of the encapsulator 60c, in the same manner as that disclosed in the second embodiment, for venting pressure and moisture laden air from inside of the headlamp arrangement 26 to atmosphere while allowing air and a limited amount of moisture back into the headlamp arrangement 26.

The vent passageway 66c extends axially from the inside of the stationary component 28 to the rear end of the screw 32c. The encapsulator member 60c encircles the rear end of the adjusting screw 32c and therefore completely encircles the rear end of the vent passageway 66c formed in the screw 32c.

When the pressure builds up within the headlamp arrangement 26, the pressurized air and any moisture which has accumulated therein will flow from inside of the stationary component 28 along the vent passageway 66c through the adjusting screw 32c, through the hollow encapsulator member 60c and through the vent 68 to atmosphere as shown by the arrows in FIG. 8. The microporous filter material 70 in the tube-like body member 72 allows the moisture and air to pass from inside the encapsulator member 60c to the atmosphere, but only allows air and a minimal amount of moisture to pass back into the stationary component 28 from the atmosphere. Since air is allowed to return into the stationary component 28, the vent 68 allows the interior of the headlamp arrangement 26 to reach equilibrium with the atmosphere while keeping the entrance of water or moisture therein to a minimum.

It is to be understood that the vent passageway through the housing could be eliminated in any of the embodiments disclosed herein, or in any other headlamp adjustor mechanism in which the novel venting structure 20 of the present invention is provided and instead, the vent passageway could be provided through the adjusting screw. For example, in the embodiment shown in FIGS. 6 and 7, the vent passageway 66b through the housing 34b could be eliminated and the passageway instead be provided through the screw 32b. The vent would then be suitably attached to the end of the adjusting screw 32b.

Alternatively, in the embodiments provided with the encapsulator member such as that shown in FIGS. 8 and 9, the through or vent passageway in the venting structure could be provided as a longitudinal groove in the outer surface of the adjusting screw through the thread portion of the screw. In this embodiment, the vent passageway through the housing has been eliminated. The vent passageway extends axially from the inside of the stationary component to the rear end of the screw. The encapsulator member encircles the rear end of the adjusting screw and therefore completely encircles the rear end of the vent passageway formed in the thread portion of the screw. The groove is milled in the thread portion after the screw is threaded or provided on a blank before the thread is rolled, with the rolled thread having a longitudinal interruption that provides the vent passageway. The vent is provided on the end of the encapsulator member as described herein.

Directing attention now to FIG. 11, a second embodiment of a vent 68a which can be used to vent any one of the embodiments of the adjustor mechanism 22, 22, 22b, 22c is illustrated. In this embodiment, the vent 68a takes the form of a flapper valve 100 and is attached to the adjustor mechanism 22, 22, 22b, 22c in the same position as which the first embodiment of the vent 68 is attached.

The flapper valve 100 is formed of a rubber tube-like body 102 having a first portion 104 and second portion 106 that is generally at a right angle to the first portion 104. A resilient, rubber flap 108 is positioned along the length of the second portion 106. The resilient flap 108 is angled at a downward slant such that pressure and moisture laden air will only open the flap 108 in one direction, i.e. when the air and moisture are flowing out to atmosphere from the inside of the stationary component 28, but when air and moisture attempt to flow back through the flapper valve 100, the flap 108 substantially blocks the flow of air and moisture therethrough.

A connector portion 110 connects the rubber flapper valve 100 to the open end of the encapsulator member 60, 60a, 60c or to the tube 96. As shown in FIG. 11, the connector 110 takes the form of an annular wall 112 that is connected to the end of the first portion 104 by a shoulder 114. The annular wall 112 is spaced from the first portion 104 at a distance which is slightly smaller than the width of the encapsulator member wall or the tube wall. When the vent 68a is attached to the end of the encapsulator member 60, 60a, 60c or to the tube 96, the wall of the encapsulator member 60, 60a, 60c or tube 96 is captured between the annular wall 112 and the end of the first portion 104. In addition, the connector portion 110 can be glued to the end of the encapsulator member 60, 60a, 60c or tube 96 to further insure that the vent 68a will remain attached as air and moisture pass through the vent 68a. Alternatively, the annular wall 112 and shoulder 114 can be eliminated and the end of the first portion 104 can be glued or otherwise affixed to the outside or inside of the end of the encapsulator member 60, 60a, 60c or tube 96.

When the pressure builds up within the headlamp arrangement, the pressurized air and any moisture which has accumulated therein will flow from inside of the stationary component 28, along the vent passageway 66, 66a, 66b, 66c through the adjustor mechanism 22, 22a, 22b, 22c respectively, through the encapsulator member 60, 60a, 60c or the tube 96 and then through the vent 68a. The air and moisture force the flap 108 downwardly to provide a passageway for the air and moisture to flow out of the vent 68a. When the pressure from the air and moisture drops to a certain level, the flap 68a will reassume its initial position to prevent the flow of a substantial amount of air or moisture through the vent 68a. A sufficient amount of air is able to leak back into the headlamp arrangement 26 around the flap 108 in the vent 68a so that the interior of the headlamp arrangement 26 can reach equilibrium with the atmosphere while keeping the entrance of water or moisture therein to a minimum.

Directing attention now to FIG. 12, a third embodiment of a vent 68b which can be used to vent any one of the embodiments of the adjustor mechanism 22, 22, 22b, 22c is illustrated. In this embodiment, the vent 68b takes the form of an absorbent material 120 housed in a basket or housing 122, such housing 122 being attached to a rubber L-shaped tube 124 which is attached to the adjustor mechanism 22, 22, 22b, 22c in the same position as which the first embodiment of the vent 68 is attached.

The rubber tube 124 has a first portion 126 and second portion 128 that is generally at a right angle to the first portion 124. A connector 130 connects the tube 124 to the open end of the encapsulator member 60, 60a, 60c or to the tube 96. The connector 130 takes the form of two annular walls 132, 134 connected to the end of the first portion 124. The annular walls 132, 134 are spaced apart from each other a distance which is slightly less than the width of the encapsulator member 60, 60a, 60c wall or to the tube 96 wall. When the vent 68b is attached to the end of the encapsulator member 60, 60a, 60c or to the tube 96, the wall of the encapsulator member 60, 60a, 60c or tube 96 is captured between the annular walls 132, 134. In addition, the connector 130 can be glued to the end of the encapsulator member 60, 60a, 60c or tube 96 to further insure that the vent 68b will remain attached as air and moisture pass through the vent 68b. Alternatively, the annular walls 132, 134 can be eliminated and the end of the first portion 124 can be glued or otherwise affixed to the outside or inside of the end of the encapsulator member 60, 60a, 60c or tube 96.

The housing 122 for the absorbent material 120 includes a main body portion 136, which houses the absorbent material 120 therein, and an inlet portion 138 and an outlet portion 140 which are integrally formed on opposite ends of the main body portion 136. The housing 122 is preferably formed from hard plastic.

Each of the inlet and outlet portions 138, 140 are formed from tubes having a central passageway 142, 144, respectively, therethrough and which extend from the main body portion 136. Screens 146, 148 are respectively provided between the absorbent material 120 and the inlet portion 138 and between the absorbent material 120 and the outlet portion 140.

The inlet portion 138 has a bead 150 formed therearound which protrudes outwardly therefrom. The inlet portion 138 of the housing 122 is inserted into the end of the second portion 126 of the L-shaped rubber tube 124 which causes the tube 124 to deform around and squeeze the bead 150 to maintain the connection between the inlet portion 138 and the tube 124. The bead 150 resists pull-out forces which could cause the housing 122 to disengage from the tube 124.

The absorbent material 120 can take the form of a porous cloth or a granulated material. The absorbent material 120 draws water in the form of moisture droplets away from the interior of the stationary component 28 and to the end of the headlamp adjustor mechanism 22, 22a, 22b and then through the vent passageway 66, 66a, 66b, 66c. The absorbent material 120 is capable of absorbing more than its weight in water.

When the pressure builds up within the headlamp arrangement 26, the absorbent material 120 will draw the pressurized air and any moisture droplets which have accumulated therein from inside of the stationary component 28, along the vent passageway 66, 66a, 66b, 66c through the adjustor mechanism 22, 22a, 22b, 22c respectively, through the encapsulator member 60, 60a, 60c or the tube 96 and then through the vent 68b. The air and moisture will flow through the passageway provided through the rubber tube 124 and through the upper screen 146. The air and moisture will then flow through the absorbent material 120 which absorbs the moisture droplets. The pressurized air will be expelled through the outlet portion 140 of the housing 122. A sufficient amount of air is able to leak back into the headlamp arrangement 26 through the absorbent material 120 so that the interior of the headlamp arrangement 26 can reach equilibrium with the atmosphere. The absorbent material 120 will, however, absorb any moisture in the air while it is flowing back into the interior of the headlamp arrangement 26.

Directing attention now to FIGS. 13 and 14, a fourth embodiment of a vent 68c which can be used to vent any one of the embodiments of the adjustor mechanism 22, 22, 22b, 22c is illustrated. In this embodiment, the vent 68c takes the form of a diaphragm or burper valve 152 housed in a protective housing 154, such housing 154 being attached to the adjustor mechanism 22, 22, 22b, 22c in the same position as which the first embodiment of the vent 68 is attached.

The burper valve 152 allows air to flow out during burning of the headlamp and limits the amount of moisture/air back into the headlamp arrangement 26. The burper valve 152 is formed from an elastomeric material and includes a stem portion 158 and an umbrella portion 160 which is integrally formed with and extends outwardly from the stem portion 158. A sealing lip 162 is provided at the extremity of the umbrella portion 160. The stem portion 158 has a passageway 164 formed therein which extends from the end of the stem portion 158 which is opposite to that which the umbrella portion 160 is formed to the start of the umbrella portion 160.

Because the burper valve 152 is formed from an elastomeric material, it is susceptible to tearing, piercing, chemicals or direct heat. To prevent damage to the burper valve, the burper valve 152 is housed in the protective plastic housing 154. The housing 154 is formed from an open-ended, cup-shaped member having a base 166 and a wall 168 extending outwardly therefrom and integrally connected to the base 166. The base 166 has an aperture 170 therethrough through which the stem portion 158 of the burper valve 152 is inserted. The sealing lip 162 of the umbrella portion 160 normally seals against the base 166 of the housing 154, except when the burper valve 152 is "blown open" as described herein. The base 162 of the housing 154 is welded, glued or snapped to the end of the encapsulator member 60, 60a, 60c or to the tube 96. When the stem portion 158 is inserted through the aperture 170 in the base 166, the passageway 164 formed in the stem portion 158 provides for fluid communication between the end of the encapsulator member 60, 60a, 60c or the tube 96 to the underside of the umbrella portion 160 of the burper valve 152.

When pressure builds up within the headlamp arrangement 26, the pressurized air and any moisture which has accumulated therein will flow from inside of the stationary component 28, along the vent passageway 66, 66a, 66b, 66c through the adjustor mechanism 22, 22a, 22b, 22c respectively, through the encapsulator member 60, 60a, 60c or the tube 96 and then through the passageway 164 in the vent 68c. The air and moisture flow into the area between the underside of the umbrella portion 160 of the burper valve 152 and the base 166 of the housing 154. When sufficient pressure builds up under the umbrella portion 160, the umbrella portion 160 is blown open. That is to say, the pressure forces the umbrella portion 160 away from the base 166 which causes the sealing lip 162 to disengage from its engagement with the base 166. The air and moisture will then flow around the edge of the sealing lip 162 to the atmosphere. When the pressure from the air and moisture drops below a predetermined level, the sealing lip 162 of the umbrella portion 160 will re-engage with the base 166 to prevent the flow of a substantial amount of air or moisture through the vent 68c. A sufficient amount of air is able to leak back into the headlamp arrangement 26 around the edges of the sealing lip 162 so that the interior of the headlamp arrangement 26 can reach equilibrium with the atmosphere while keeping the entrance of water or moisture therein to a minimum.

Attention is now directed to FIG. 15, which shows a fifth embodiment of a vent 68d which can be used to vent any one of the embodiments of the adjustor mechanism 22, 22, 22b, 22c. In this embodiment, the vent 68d takes the form of a check valve 172 which is connected to an elastomeric tube 174 which is in turn connected to an adaptor 176. The adaptor 176 is connected to the adjustor mechanism 22, 22, 22b, 22c in the same position as which the first embodiment of the vent 68 is attached. The check valve 172 allows air to flow out during burning of the headlamp and limits the amount of moisture/air back into the headlamp arrangement 26.

The elastomeric tube 174 is L-shaped and formed from a first portion 178 and a second portion 180 which is integrally formed with the first portion 178 and is disposed at a right angle relative thereto. The tube 174 has a central passageway therethrough.

The adaptor 176, which is formed from hard plastic or the like, includes a base portion 182 and a connector portion 184 which extends outwardly therefrom. A central passageway is provided through the adaptor 176. The base portion 182 of the adaptor 176 is welded, glued or snapped fitted to the end of the encapsulator member 60, 60a, 60c or to the tube 96.

The connector portion 184 of the adaptor 176 has a bead 186 formed therearound which protrudes outwardly therefrom. The connector portion 184 of the adaptor 176 is inserted into the end of the first portion 178 of the L-shaped rubber tube 174 which causes the tube 174 to deform around and squeeze the bead 186 to maintain the connection between the connector portion 184 and the tube 174. The bead 186 resists pull-out forces which could cause the tube 174 and housing 172 to disengage from the adaptor 176. Alternatively, the adaptor 176 could be eliminated and instead, a connector like connector 130 shown in the third embodiment of the vent 68b can be used. Additionally, in the third embodiment of the vent 68b, an adaptor like adaptor 176 could be provided and the connector 130 eliminated.

The check valve 172 is formed from a plastic outer housing 188, and an inlet portion 190 and an outlet portion 192 integrally formed on opposite ends of the outer housing 188. The inlet portion 190 and the outlet portion 192 are each formed from a tube having a central passageway therethrough which extends from the housing 188. The inlet portion 190 has a bead 194 formed therearound which protrudes outwardly therefrom. The inlet portion 190 is inserted into the end of the second portion 180 of the L-shaped rubber tube 174 which causes the tube 174 to deform around and squeeze the bead 194 to maintain the connection between the check valve 172 and the tube 174. The bead 194 resists pull-out forces which could cause the tube 174 and check valve 172 to disengage from each other.

The outer housing 188 has a tube 196 therein providing a central passageway through the housing 188 which is in fluid communication with the passageway through the elastomeric tube 174. The tube 196 has an enlarged section 198 which houses a ball 200 therein and joins the remainder of the tube 196 at an upper inlet 202 and a lower outlet 204. The enlarged section 198 has a diameter which is slightly larger than the diameter of the ball 200 so that air and moisture can pass around the ball 200 as described herein.

Normally, the ball 200 is seated against the upper inlet 202 to the enlarged section 198 when the headlamp is not turned on or burning. When the pressure builds up within the headlamp arrangement 26, the pressurized air and any moisture which has accumulated therein will flow from inside of the stationary component 28, along the vent passageway 66, 66a, 66b, 66c through the adjustor mechanism 22, 22a, 22b, 22c respectively, through the encapsulator member 60, 60a, 60c or the tube 96 and then through the adapter passageway, the elastomeric tube 174 and the check valve 172. The air and moisture force the ball 200 downwardly to open the inlet 202 to the enlarged section 198 and to provide a passageway for the air and moisture to flow through the enlarged section 198, around the ball 200 and out of the check valve 172. When the pressure from the air and moisture drops to a certain level, the ball 200 will move upwardly and reseal with the inlet 202 to the enlarged section 198 to prevent the flow of a substantial amount of air or moisture through the check valve 172. A sufficient amount of air is able to leak back into the headlamp arrangement 26 around the ball 200 so that the interior of the headlamp arrangement 26 can reach equilibrium with the atmosphere while keeping the entrance of water or moisture therein to a minimum.

Attention is now directed to FIGS. 16 and 17 which show a sixth embodiment of a vent 68e which can be used to vent any one of the embodiments of the adjustor mechanism 22, 22, 22b, 22c. In this embodiment, the vent 68e takes the form of an expandable and deflatable elastomeric bladder or balloon 206 housed in a plastic protective housing 208. The housing 208 protects the bladder 206 against damage from foreign objects which may come into contact with the bladder 206.

As shown in FIGS. 16 and 17, the housing 208 is formed from a front wall 210 with a side wall 212 integrally formed therewith and extending rearwardly therefrom. The side wall 212 is not closed at its opposite end. The front wall 210 is welded, glued or snapped to the end of the encapsulator member 60, 60a, 60c or to the tube 96 by suitable means. An aperture 214 is provided through the front wall 210 and is aligned with the end of the encapsulator member 60, 60a, 60c or to the tube 96.

The bladder 206 has a main body portion 215 and a neck portion 216 which is inserted through and sealed with the aperture 214 in the front wall 210 of the housing 208. The neck portion 216 has a passageway 218 formed therein which extends from the end of the neck portion 216 which is opposite to that which the main body portion 215 is formed to the start of the main body portion 215.

Because the headlamp arrangement 26 is a sealed, closed system, the bladder 206 expands and contracts with the amount of expansion and contraction as determined by the volume of the headlamp and the heat created by the light bulb. When the headlamp is on or burning and sufficient pressure builds up within the headlamp arrangement 26, air from the interior of the headlamp arrangement 26 passes through the passageway 218 in the neck portion 216 and into the main body portion 215 of the bladder 206 to cause the bladder 206 to inflate or expand. FIG. 17 shows the bladder in its expanded state during when the light bulb is on. When the headlamp is turned off or once the air pressure drops beneath a predetermined pressure, the air passes from the bladder 206, through the neck portion 216 and back into the interior of the headlamp arrangement 26 which causes the bladder 206 to deflate. FIG. 16 illustrates the bladder 206 in a contracted state when the light bulb is off or after it has been burned.

To further prevent damage to the bladder 206, the protective housing 208 can further include a cap 220 which attaches to the end of the side wall 212 to close the end of the housing 208 as shown in FIG. 18. This substantially prevents entrance of foreign objects into the housing 208 from the rear. The cap 220 is secured to the side wall 212 by suitable means, such as adhesive or welding. A vent aperture 222 is provided through the cap 220 to allow the air within the housing 208 to escape when the bladder 206 expands and to allow air to enter into the housing 208 when the bladder 206 deflates.

In the embodiments shown in FIGS. 16–18, of course, the shape of the protective housing 208 and the cap 222 may take on different geometry given the amount of volume displacement and the space behind the headlamp. Note: moisture is not vented from the headlamp arrangement 26 to atmosphere using these embodiments because only air and moisture are passed from the interior of the headlamp arrangement 26 to the bladder 206 and from the bladder 206 to the interior of the headlamp arrangement 26. In these embodiments, the headlamp arrangement 26 is a completely sealed system so the accumulation of moisture therein will be minimal.

Attention is now directed to FIGS. 19 and 20 which show seventh and eighth embodiments of a vent 68f, 68g, respectively, which can be used to vent any one of the embodiments of the adjustor mechanism 22, 22, 22b, 22c. In these embodiments, the vent 68f, 68g takes the form of a condenser or labyrinth.

As shown in FIG. 19, the condenser 68f is a U-shaped tube member 224 which is attached to the end of the encapsulator member 60, 60a, 60c or to the tube 96 by suitable means. The U-shaped tube member 224 includes an upper leg 226, a middle leg 228 and a lower leg 230. The upper and middle legs 226, 228 are generally perpendicular to each other and are attached to each other by an upper bend. The middle and lower legs 228, 230 are generally perpendicular to each other and are attached to each other by a lower bend. A circular is flange 232 is provided at the end of the lower leg 230 to form a drip lip. The U-shaped tube member 224 may be formed from adsorbent material, such as metal, plastic and elastomers. This material may be used to form the condenser or the entire adaptor to the rear of the adjustor mechanism 22, 22, 22b, 22c. Adsorbent material is defined as a material that attracts water but does not retain it.

In this embodiment, the tube member 224 is the sole component in both venting and condensing moisture. With regard to the venting function of the tube member 224, hot air flows out during burning of the headlamp. With regard to the condensing function of the tube member 224, after the headlamp is turned off, the headlamp arrangement 26 will begin to cool down. Moisture with cool air will begin to enter the lamp housing at an opening of least resistance. In this case, this is the end of the adjustor mechanism 22, 22, 22b, 22c where the condenser 68f is positioned. Further, moisture is attracted to the coolest parts of the lamp. In most cases, this will be the extremities of the lamp, which in this case is the backside of the adjustor mechanism 22, 22, 22b, 22c where the condenser 68f is mounted. The flow of the moist, cool air is very slow and, as the moisture flows up the U-shaped tube member 224 in the headlamp adjustor mechanism 22, 22, 22b, 22c, the moisture adheres to the sides of the tube member 224. This results because the U-shaped tube member 224 is formed out of an adsorbent material and is the coolest part of the lamp. As the moisture reaches the upper bend of the U-shaped tube member 224, the moisture condenses into water droplets. Gravity then causes the accumulated water droplets to flow down the length of the U-shaped tube member 224 and out of the tube 224 to the atmosphere. The lip 232 facilitates the movement of the droplets down and away from the headlamp.

The embodiment shown in FIG. 20 provides a more complex condenser 68g than that shown in FIG. 19. In this embodiment, the condenser 68g takes the form of an L-shaped tube member 234 having an upper leg 236 which is attached to the end of the encapsulator member 60, 60a, 60c or to the tube 96 by suitable means, and a lower leg 238 integrally formed with and attached to the upper leg 236 by a bend. A generally circular flange 240 is provided at the end of the lower leg 238 to form a drip lip. The L-shaped tube member 234 may be formed from adsorbent material, such as metal, plastic and elastomers. This material may be used to form solely the condenser 68g or to form the entire adaptor to the rear of the adjustor mechanism 22, 22, 22b, 22c.

The lower leg 238 of the L-shaped tube member 234 has a secondary plastic component 242 secured therein by suitable means. The secondary component 242 is a tube-like member which has a plurality of finger-like protrusions or baffles 244 molded therein. The baffles 244 make it very difficult for the moisture to get into the headlamp and very easy for water in the form of droplets to leave the headlamp. A circular flange 246 may be provided at the end of the secondary component to provide a drip lip. The circular flange 246 mates with the circular flange 240 of the tube member 234.

Like the embodiment shown in FIG. 19, in this embodiment, the tube member 234 is the sole component in both venting and condensing moisture. With regard to the venting function of the tube member 234, hot air flows out during burning of the headlamp. With regard to the condensing function of the tube member 234, after the headlamp is turned off, the headlamp arrangement 26 will begin to cool down. Moisture with cool air will begin to enter the lamp housing at an opening of least resistance which is at the headlamp adjustor mechanism 22, 22, 22b, 22c and specifically, through the condenser 68g. The flow of the moist, cool air is very slow and, as the moisture flows up the L-shaped tube member 234 in the headlamp adjustor mechanism 22, 22, 22b, 22c, the moisture adheres to the baffles 244 within the secondary component 242 and condenses into water droplets. This results because the L-shaped tube member 234 is formed out of an adsorbent material and is the coolest part of the headlamp. Gravity then causes the accumulated water droplets to flow down the length of the L-shaped tube member 234 and out of the tube 234 to the atmosphere. The lip 240 facilitates the movement of the droplets down and away from the headlamp.

In addition, a filter (not shown) may be included along the length of the U-shaped member 224 shown in FIG. 19 or the L-shaped member 234 shown in FIG. 20 to further prevent moisture and dust from entering into the headlamp. One such example of this type of filter is shown in U.S. Pat. No. 5,406,467 (see specifically FIG. 3), which disclosure is herein incorporated by reference. As described in the '467 patent, "the filter must have a pore size great enough to allow water vapor to easily exit the light fixture, yet small enough to effectively resist the inspiration of a substantial amount of the dust particles from any inflowing stream of air" (reference numerals omitted). When the embodiments of the vents 68f, 68g of FIGS. 19 and 20 are used, it is up to the lamp designer to determine if dust is a factor in the headlamp design to necessitate the use of such a filter. Economy and warranty of the headlamp manufacturer are other factors that can be used to determine whether a filter should be employed.

The adjustor mechanism 22, 22a, 22b, 22c of the present invention serves a dual purpose. The mechanism 22, 22a, 22b, 22c vents as well as adjusts the position of the moveable headlamp component 24. Since the vent has been incorporated into the adjustor mechanism structure, the overall cost of the headlamp arrangement 26 is reduced.

It is also to be understood that while specific embodiments of vents and moisture traps or barriers are shown and described, one of ordinary skill in the art could modify the type of vent used in the present invention or the exact location of the vent on the adjustor mechanism. Further, while all of the illustrated embodiments employ some form of moisture barrier or moisture trap in conjunction with the vented adjustor, it should be noted that these may be dispensed with and the adjustor mechanism with its venting aperture employed to provide the desired and necessary pressure relief or venting for the headlamp.

While preferred embodiments of the present invention are shown and described, it is envisioned that those skilled in the art may devise various modifications of the present invention without departing from the spirit and scope of the appended claims.

The invention claimed is:

1. A headlamp adjustor mechanism for attachment to and which is used to effect movement of a movable component of a sealed headlamp arrangement and mountable to a stationary component of said headlamp arrangement, said headlamp adjustor mechanism comprising: a housing having a portion being in communication with the interior of said headlamp arrangement, and a vent passageway provided through said headlamp adjustor mechanism when said headlamp adjustor mechanism is engaged with the stationary component, said vent passageway leading from the interior of said headlamp arrangement to the exterior thereof for venting air from the interior of said headlamp arrangement to the exterior of said headlamp arrangement.

2. A headlamp adjustor mechanism as defined in claim 1, wherein said vent passageway is formed through said housing.

3. A headlamp adjustor mechanism for attachment to a movable component of a sealed headlamp arrangement and mountable to a stationary component of said headlamp arrangement, said headlamp adjustor mechanism comprising: a housing having a portion being in communication with the interior of said headlamp arrangement, and a vent passageway provided by said headlamp adjustor mechanism leading from the interior of said headlamp arrangement to the exterior thereof for venting air from the interior of said headlamp arrangement to the exterior of said headlamp arrangement, said vent passageway being provided by a through bore provided through said adjustor mechanism from the interior of said headlamp arrangement to the exterior of said headlamp arrangement, and further including an additional vent structure associated with said housing and being in fluid communication with said through bore.

4. A headlamp adjustor mechanism as defined in claim 3, wherein said vent structure comprises a microporous filter material.

5. A headlamp adjustor mechanism as defined in claim 4, wherein said vent structure further includes a tube member for housing said microporous filter material and a cap being engaged with said tube member which allows the passage of air from inside of the tube member to the atmosphere.

6. A headlamp adjustor mechanism as defined in claim 3, wherein said vent structure comprises a flapper valve.

7. A headlamp adjustor mechanism as defined in claim 3, wherein said vent structure comprises an absorbent material housed in a housing member.

8. A headlamp adjustor mechanism as defined in claim 7, further including a screen member provided on each end of said absorbent material.

9. A headlamp adjustor mechanism as defined in claim 3, wherein said vent structure comprises a burper valve housed in a housing.

10. A headlamp adjustor mechanism as defined in claim 3, wherein said vent structure comprises a check ball housed in a housing.

11. A headlamp adjustor mechanism as defined in claim 3, wherein said vent structure comprises an expandable and deflatable bladder housed in a housing.

12. A headlamp adjustor mechanism as defined in claim 3, wherein said vent structure comprises a condenser tube member.

13. A headlamp adjustor mechanism as defined in claim 12, wherein said condenser tube member is formed from an adsorbent material.

14. A headlamp adjustor mechanism as defined in claim 12, wherein said condenser tube member is U-shaped.

15. A headlamp adjustor mechanism as defined in claim 14, wherein said condenser tube member further includes a lip at a bottommost end thereof.

16. A headlamp adjustor mechanism as defined in claim 12, wherein said condenser tube member is L-shaped.

17. A headlamp adjustor mechanism as defined in claim 16, wherein said condenser tube member further includes a lip at a bottommost end thereof.

18. A headlamp adjustor mechanism as defined in claim 12, wherein said condenser tube member further includes an insert provided therein, said insert having a plurality of baffles therein.

19. A headlamp adjustor mechanism for attachment to a movable component of a sealed headlamp arrangement and mountable to a stationary component of said headlamp arrangement, said headlamp adjustor mechanism comprising: a housing having a portion being in communication with the interior of said headlamp arrangement, an adjusting screw member1, and a vent passageway provided by said headlamp adjustor mechanism leading from the interior of said headlamp arrangement to the exterior thereof for venting air from the interior of said headlamp arrangement to the exterior of said headlamp arrangement, said vent passageway being formed through said adjusting screw member.

20. A headlamp adjustor mechanism as defined in claim 19, wherein said adjusting screw member includes a threaded portion, and said vent passageway is formed through said threaded portion.

21. A venting structure for use with a headlamp adjustor mechanism which is used to effect pivotal motion of a movable headlamp component in a sealed headlamp arrangement, said venting structure comprising: a vent passageway through the headlamp adjustor mechanism for venting air from the interior of the headlamp arrangement to the exterior of said headlamp arrangement.

22. A venting structure as defined in claim 21, further including a vent connected to said headlamp adjustor mechanism and in communication with said vent passageway, said vent allowing air to pass from the interior of said headlamp arrangement to the exterior thereof.

23. A method of venting air from an interior of a headlamp arrangement, said headlamp arrangement including a movable headlamp component which is housed in a sealed stationary component, said method comprising the steps of:

providing a headlamp adjustor mechanism in sealed engagement with said sealed stationary component, with a portion of said headlamp adjustor mechanism being in communication with the interior of said headlamp arrangement;

providing a venting structure comprising a vent passageway through said headlamp adjustor mechanism; and venting air outwardly from the interior of the sealed stationary component to the exterior thereof through said venting structure.

24. The method of claim 23, wherein said step of providing a venting structure further comprises providing a vent which is connected to said headlamp adjustor mechanism and is in communication with the vent passageway.

25. The method of claim 24, wherein the step of venting air outwardly from the interior of the sealed stationary component to the exterior thereof through said vent structure comprises venting said air to an interior of said vent and further including the step of allowing air to pass from the interior of the vent to the interior of the sealed stationary component through said vent passageway.

26. The method of claim 23, wherein the step of venting air outwardly from the interior of the sealed stationary component to the exterior thereof through said vent structure further comprises venting moisture and said air to the atmosphere, and further including the step of allowing air and a limited amount of moisture to pass from the atmosphere to the interior of the sealed stationary component through said vent structure.

* * * * *